US012809841B2

(12) United States Patent
Wang et al.

(10) Patent No.: US 12,809,841 B2
(45) Date of Patent: Nov. 24, 2026

(54) MULTI-VECTOR SEARCH INDEX TUNING

(71) Applicant: Microsoft Technology Licensing, LLC, Redmond, WA (US)

(72) Inventors: Yue Wang, Redmond, WA (US); Bailu Ding, Bellevue, WA (US); Philip A. Bernstein, Bellevue, WA (US); Vivek Ravindranath Narasayya, Redmond, WA (US); Surajit Chaudhuri, Kirkland, WA (US); Jiongli Zhu, San Diego, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/185,692

(22) Filed: Apr. 22, 2025

(65) Prior Publication Data

US 2026/0359276 A1 Nov. 12, 2026

(51) Int. Cl.
*G06F 16/22* (2019.01)
*G06F 16/2453* (2019.01)

(52) U.S. Cl.
CPC .... *G06F 16/2237* (2019.01); *G06F 16/24545* (2019.01)

(58) Field of Classification Search
CPC ....................... G06F 16/2237; G06F 16/24545
See application file for complete search history.

(56) References Cited

U.S. PATENT DOCUMENTS 11,860,869 B1 * 1/2024 Hwang ............. G06F 16/24549
2019/0392058 A1 * 12/2019 Konow Krause ... G06F 16/2237
2025/0190481 A1 * 6/2025 Shrestha ............. G06F 16/3347

OTHER PUBLICATIONS

Chen et al., "Onesparse: A Unified System for Multi-index Vector Search", hereinafter Chen. (Year: 2024).*
Pennington, et al., "GloVe: Global Vectors for Word Representation", In Proceedings of the Conference on Empirical Methods in Natural Language Processing, 2014, pp. 1532-1543.
Qin Lv, "MultiProbe LSH: Efficient Indexing for High Dimensional Similarity Search", In Proceedings of the 33rd international conference on Very large data bases, Sep. 23, 2007, pp. 950-961.
R.Gray, "Vector quantization", IEEE ASSP Magazine 1, No. 2, 1984, pp. 205-231.
Radford, et al., "Learning Transferable Visual Models From Natural Language Supervision", In the Proceedings of the 38th International Conference on Machine Learning, vol. 139, Jul. 18, 2021, 16 Pages.
S Lloyd, "Least Squares Quantization in PCM", In Journal of IEEE Transactions on Information, vol. 28, Issue 2, Mar. 1982, pp. 129-136.

(Continued)

*Primary Examiner* — Khanh B Pham
*Assistant Examiner* — Kweku William Halm
(74) *Attorney, Agent, or Firm* — Ray Quinney & Nebeker P.C.; Tiffany B. Healy

(57) ABSTRACT

The present disclosure relates to systems and methods for multi-vector search index tuning. The systems and methods select a recommended configuration of vector indexes for a given set of multi-vector queries while maintaining storage constraints and recall constraints for the vector indexes. The systems and methods output the recommended configuration of vector indexes to use in responding to multi-vector queries.

20 Claims, 4 Drawing Sheets

(56) References Cited

OTHER PUBLICATIONS

Simhadri, et al., "Results of the Big ANN: NeurIPS'23 competition", arXiv preprint arXiv:2409.17424, Sep. 25, 2024, 10 Pages.
Simhadri, et al., "Results of the NeurIPS'21 Challenge on Billion-Scale Approximate Nearest Neighbor Search" In Proceedings of the NeurIPS 2021 Competitions and Demonstrations Track, vol. 176. PMLR, 13 Pages.
Sivic, et al., "Video Google: A Text Retrieval Approach to Object Matching in Videos", Proceedings of the 9th IEEE International Conference on Computer Vision, Oct. 14-17, 2003, 8 Pages.
Srivastava, et al., "Multimodal learning with deep boltzmann machines", Advances in neural information processing systems, vol. 25, 2012, 9 Pages.
Su, et al., "Vexless: A Serverless Vector Data Management System Using Cloud Functions", Proceedings of the ACM on Management of Data, May 29, 2024, vol. 2(3), 26 Pages.
Subramanya, et al., "DiskANN: fast accurate billionpoint nearest neighbor search on a single node", Advances in neural information processing Systems., 2019, 11 Pages.
Tautkute, et al., "What looks good with my sofa: Multimodal search engine for interior design", In Repository of arXiv:1707.06907v2 [cs.CV], Jan. 8, 2018, In 2017 Federated Conference on Computer Science and Information Systems (FedCSIS), 8 Pages.
Wang, et al., "A comprehensive survey and experimental comparison of graph-based approximate nearest neighbor search", In Repository of arXiv:2101.12631v1 [cs.IR], Proc. VLDB Endow. vol. 14, No. 11, 2021, 22 pages.
Wang, et al., "Milvus: A purpose-built vector data management system", InProceedings of the 2021 international conference on management of data, Jun. 9, 2021, pp. 2614-2627.
Wang, et al., "Must: An effective and scalable framework for multimodal search of target modality", In2024 IEEE 40th International Conference on Data Engineering (ICDE), May 13, 2024, 22 Pages.
Wei, et al., "AnalyticDB-V: a Hybrid Analytical Engine Towards Query Fusion for Structured and Unstructured Data", Proceedings of the VLDB Endowment, vol. 13, Issue 12, Aug. 1, 2020, pp. 3152-3165.
Wen, et al., Comprehensive linguistic-visual composition network for image retrieval. InProceedings of the 44th International ACM SIGIR Conference on Research and Development in Information, Retrieval Jul. 11, 2021, pp. 1369-1378.
Wu, et al., "Automatic Index Tuning: A Survey", IEEE Transactions on Knowledge and Data Engineering, vol. 36(12) Jul. 2, 2024, 20 Pages.
Yandex, et al., "Efficient Indexing of BillionScale Datasets of Deep Descriptors", InProceedings of the IEEE Conference on Computer Vision and Pattern Recognition 2016, pp. 2055-2063.
Yang, et al.,"PASE: PostgreSQL Ultra-High-Dimensional Approximate Nearest Neighbor Search Extension", InProceedings of the 2020 ACM SIGMOD international conference on management of data, Jun. 11, 2020, pp. 2241-2253.
Yu, et al., "Efficient and robust approximate nearest neighbor search using Hierarchical Navigable Small World graphs", In IEEE transactions on pattern analysis and machine intelligence 42.4 2018, 13 Pages.
Zhang, et al., "VBASE: Unifying Online Vector Similarity Search and Relational Queries via Relaxed Monotonicity", USENIX Symposium on Operating Systems Design and Implementation (OSDI 23), Jul. 10, 2023, pp. 377-395.
Zhu, et al., "MINT: Multi-Vector Search Index Tuning", In Repository of https://arxiv.org/pdf/2504.20018, Apr. 28, 2025, 14 Pages.
"Apache Lucene", 2025, Retrieved from https://lucene.apache.org/., 2025, 2 pages.
"Azure AI Search", Retrieved from https://azure.microsoft.com/en-us/products/ai-services/ai-search/, Jul. 29, 2025, 9Pages.
"PGVector", Retrieved from https://github.com/pgvector/pgvector/, 2025, 22 Pages.
"Pinecone", Retrieved form https://www.pinecone.io/, 2025, 1 Page.
"Zilliz", Retrieved from https://zilliz.com/, 2025, 10 Pages.
Anan, et al., "Optimised KD-trees for fast image descriptor matching", In2008 IEEE conference on computer vision and pattern recognition, Jun. 23, 2008, 8 Pages.
Andoni, et al., "Near-optimal hashing algorithms for approximate nearest neighbor in high dimensions", Communications of the ACM, Jan. 2008, pp. 117-122.
Asai, et al., "Retrieval-based language models and applications", In Proceedings of the 61st Annual Meeting of the Association for Computational Linguistics, vol. 6, Tutorial Abstracts, Jul. 2023, pp. 41-46.
Aumuller, et al., "Ann-Benchmarks: A benchmarking Tool for Approximate Nearest Neighbor Algorithms", In Proceedings of 10th International Conference on Similarity Search and Applications, In Repository of arXiv:1807.05614v2 [cs.IR], Jul. 17, 2018 20 Pages.
Babenko, et al., "The inverted multi-index", IEEE transactions on pattern analysis and machine intelligence, No. 37 (6), Oct. 2, 2014 ;37(6): pp. 1247-1260. 2014.
Baltrušaitis, et al.,"Multimodal machine learning: A survey and taxonomy", In Repository of arXiv:1705.09406v2 [cs.LG] , Aug. 1, 2017, 20 Pages.
Boytsov, et al., "Engineering Efficient and Effective Non-metric Space Library", In International Conference on Similarity Search and Applications, vol. 8199, Oct. 2, 2013, 14 Pages.
Bruno, et al., "Automatic physical database tuning: A relaxation-based approach.", Proceedings of the 2005 ACM SIGMOD international conference on Management of data, Jun. 14, 2005, 12 Pages.
Chaudhuri, et al., "An Efficient Cost-Driven Index Selection Tool for Microsoft SQL Server", In Proceedings of the 23rd International Conference on Very Large Data Bases (VLDB '97), Aug. 25, 1997, vol. 97, 10 Pages.
Chaudhuri, et al., "AutoAdmin "what-if" index analysis utility.", ACM SIGMOD Record, vol. 27, No. 2, 1998, pp. 367-378.
Chaudhuri, et al., "Index selection for databases: A hardness study and a principled heuristic solution.", IEEE transactions on knowledge and data engineering, vol. 16, No. 11, 2004, pp. 1313-1323.
Chaudhuri, et al., "Random sampling for histogram construction: how much is enough?", SIGMOD Rec. vol. 27, No. 2, Retrieved form https://sci-hub.se/10.1145/276305.276343, Jun. 1, 1998, pp. 436-447.
Chaudhuri, et al., "Self-tuning Database Systems: A Decade of Progress", In Proceedings of the 33rd International Conference on Very Large Data Bases, Sep. 23, 2007, pp. 3-14.
Chen, et al., "OneSparse: A Unified System for Multi-index Vector Search", In Companion Proceedings of the ACM Web Conference 2024, May 13, 2024, pp. 393-402.
Chen, et al., "SPANN: Highly-effcient Billion-scale Approximate Nearest Neighbor Search", In Repository of arXiv:2111.08566v1 [cs.DB], Nov. 5, 2021, 13 Pages.
Chen, et al., SPTAG: A library for fast approximate nearest neighbor search. Retrieved from https://github.com/Microsoft/SPTAG, Retrieved date Jul. 29, 2025, 8 Pages.
Cover, et al., "Nearest Neighbor Pattern Classification", IEEE Transactions on Information Theory, vol. IT-13, No. 1, 2006, Jan. 1967, pp. 21-27.
Dasgupta, et al., "Random projection trees and low dimensional manifolds", In Proceedings of the Fortieth Annual ACM Symposium on Theory of Computing (Victoria, British Columbia, Canada) (STOC '08), 2008, 10 Pages.
Dash, et al., "Cophy: A scalable, portable, and interactive index advisor for large workloads.", arXiv preprint arXiv:1104.3214, 2011, pp. 362-372.
Datar, "Locality-Sensitive Hashing Scheme Based on p-Stable Distributions", In Proceedings of the twentieth annual symposium on Computational geometry, Jun. 8, 2004, pp. 253-262.
Douze, et al., "The faiss library", In Repository of arXiv:2401.08281v1, Sep. 6, 2024, 22 pages.
Duong, et al., "Effcient and effective multi-modal queries through heterogeneous network embedding", IEEE Transactions on Knowledge and Data Engineering, vol. 34, No. 11, 2021, 14 Pages.

(56) References Cited

OTHER PUBLICATIONS

Feige, et al., "On the densest k-subgraph problems. Technical Report", The Weizmann Institute, ISR, 1997.
Fu, et al., "Fast approximate nearest neighbor search with the navigating spreading-out graph", arXiv preprintarXiv:1707.00143, Jul. 1, 2017, 9 Pages.
Ge, et al., "Optimized Product Quantization for Approximate Nearest Neighbor Search", In Proceedings of IEEE Conference on Computer Vision and Pattern Recognition, Jun. 23, 2013, pp. 2946-2953.
Guo, et al., "Accelerating Large-Scale Inference with Anisotropic Vector Quantization", Proceedings of the 37th International Conference on Machine Learning- PMLR, vol. 119, 2020, 10 Pages.
Guo, et al., "Manu: a cloud native vector database management system", In Repository of arXiv preprint arXiv:2206.13843, Jun. 28, 2022, 14 Pages.
Huang, et al., "Embedding-based retrieval in Facebook search", In Proceedings of the 26th ACM SIGKDD International Conference on Knowledge Discovery & Data Mining, Aug. 23, 2020, pp. 2553-2561.
Jegou, et al., "Product Quantization for Nearest Neighbor Search", IEEE transactions on pattern analysis and machine intelligence, vol. 33, No. 1, Jan. 2011, pp. 117-128.
Jing, et al., "When large language models meet vector databases: A survey", In Repository of arXiv preprint arXiv:2402.01763, Nov. 1, 2024, 7 Pages.
Johnson, et al., "Billion-Scale Similarity Search with GPUs", In Repository of arXiv: 1702.08734v1, Feb. 28, 2017, 12 Pages.
Jon Louis Bentley., "Multidimensional binary search trees used for associative searching" Communications of the ACM. Sep. 1, 1975, pp. 509-517.
Li, et al., "Latesteval: Addressing data contamination in language model evaluation through dynamic and timesensitive test construction", InProceedings of the AAAI Conference on Artificial Intelligence, vol. 38, No. 17, Mar. 24, 2024, pp. 18600-18607.
Liu et al., "SK-LSH: an effcient index structure for approximate nearest neighbor search", Proceedings of the VLDB Endowment, vol. 7, No. 9 May 1, 2014, pp. 745-756.
Luo, et al., "End-to-end knowledge retrieval with multi-modal queries", In Repository of arXiv preprintarXiv:2306.00424, Jun. 1, 2023.
Lv, et al., "Multiprobe LSH: efficient indexing for high-dimensional similarity search", InProceedings of the 33rd international conference on Very large data bases, Sep. 23, 2007, pp. 950-961.
M Omohundro, "Five balltree construction algorithms", Technical Report, International Computer Science Institute, Nov. 20, 1989, 22 Pages.
Malkov, et al., "Approximate nearest neighbor algorithm based on navigable small world graphs", Information Systems , vol. 45, 2014, pp. 61-68.
Malkov, et al., "Efficient and robust approximate nearest neighbor search using hierarchical navigable small world graphs", IEEE transactions on pattern analysis and machine intelligence, vol. 42, No. 4, Dec. 28, 2018, 13 Pages.
Morozov, et al., "Non-metric Similarity Graphs for Maximum Inner Product Search", 32nd Conference on Neural Information Processing Systems (NeurIPS 2018), 2018, 10 Pages.
Muja, et al., "Fast Approximate Nearest Neighbors with Automatic Algorithm Configuration", In Proceedings of the Fourth International Conference on Computer Vision Theory and Applications, Lisboa, Portugal, vol. 1, Feb. 5, 2009, pp. 331-340.
Norouzi, et al., "Fast Search in Hamming Space with Multi-Index Hashing" In2012 IEEE conference on computer vision and pattern recognition Jun. 16, 2012, 8 Pages.
Nussbaum, et al., "Nomic embed: Training a reproducible long context text embedder", In Repository of arXiv:2402.01613v1 [cs.CL], Feb. 2, 2024, 12 Pages.
Pan, et al., "Survey of vector database management systems," The VLDB Journal, Sep. 2024, 25 Pages.
Pan, et al., Vector Database Management Techniques and Systems:, InCompanion of the 2024 International Conference on Management of Data, Jun. 9, 2024, pp. 597-604.

* cited by examiner

MULTI-VECTOR SEARCH INDEX TUNING

BACKGROUND

Vector search plays a crucial role in many real-world applications. In addition to single-vector search, multi-vector search becomes important for multi-modal and multi-feature scenarios. In a multi-vector database, each row is an item, each column represents a feature of items, and each cell is a high-dimensional vector. In multi-vector databases, the choice of indexes can have a significant impact on performance. Index tuning for multi-vector search remains unclear and challenging.

BRIEF SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some implementations relate to a method. The method includes receiving a multi-vector query workload. The method includes receiving a recall constraint and storage constraint for the multi-vector query workload. The method includes selecting a configuration of vector indexes that is a subset of potential vector indexes. The method includes selecting a multi-vector query from the multi-vector query workload. The method includes receiving a query plan with a recommended configuration of vector indexes, a cost estimation, and a recall estimation for the configuration and the multi-vector query. The method includes outputting the recommended configuration of vector indexes in response to verifying the storage constraint and the recall constraint are satisfied, wherein the recommended configuration of vector indexes includes a multi-column index.

Some implementations relate to a device. The device includes a memory to store data and instructions; and a processor operable to communicate with the memory, wherein the processor is operable to: receive a multi-vector query workload; receive a recall constraint and storage constraint for the multi-vector query workload; select a configuration of vector indexes that is a subset of potential vector indexes; select a multi-vector query from the multi-vector query workload; receive a query plan with a recommended configuration of vector indexes, a cost estimation, and a recall estimation for the configuration and the multi-vector query; output the recommended configuration of vector indexes in response to verifying the storage constraint and the recall constraint are satisfied, wherein the recommended configuration of vector indexes includes a combination of multi-column indexes and single column indexes; and use the recommended configuration in responding to multi-vector queries.

Some implementations relate to a computer-readable storage medium including instructions that, when executed by a processor, cause the processor to: receive a multi-vector query workload; receive a recall constraint and storage constraint for the multi-vector query workload; select a configuration of vector indexes that is a subset of potential vector indexes; select a multi-vector query from the multi-vector query workload; receive a query plan with a recommended configuration of vector indexes, a cost estimation, and a recall estimation for the configuration and the multi-vector query; output the recommended configuration of vector indexes in response to verifying the storage constraint and the recall constraint are satisfied, wherein the recommended configuration of vector indexes includes a combination of multi-column indexes and single column indexes; and use the recommended configuration in responding to multi-vector queries.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
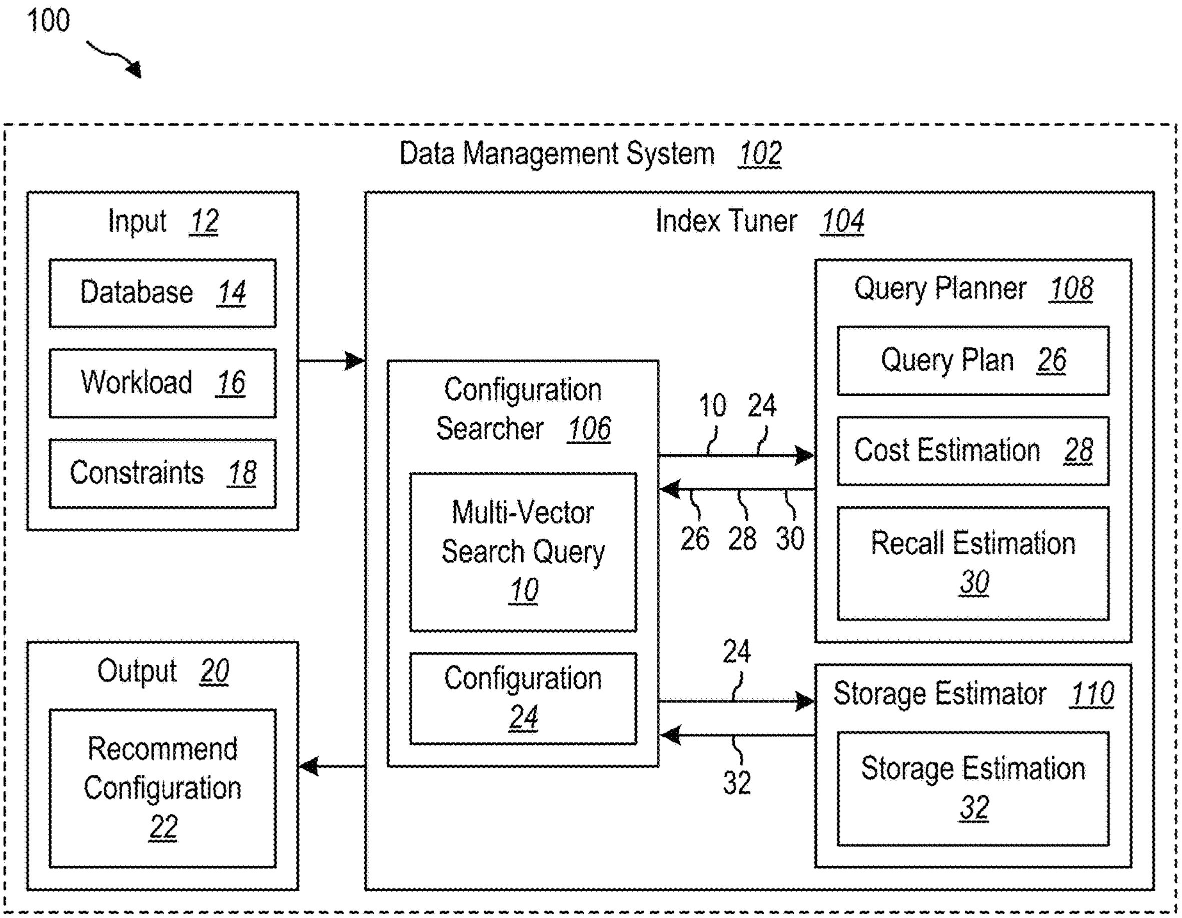
FIG. 1 illustrates an example environment for multi-vector search index tuning in accordance with implementations of the present disclosure.

This disclosure generally relates to multi-vector search index tuning. Vector similarity search plays a crucial role in many real-world applications (e.g., semantic search and retrieval-augmented generation (RAG)). However, due to the high dimensionality and large volume of data involved, performing exact similarity search is often computationally intractable. Vector search indexes have been developed approximating search results, for example, approximate nearest neighbor (ANN) search.

Many existing approaches focus on single-domain data, overlooking that real-world datasets often contain information across multiple modalities, such as text, image, and video. In addition to single-vector search, multi-vector search becomes important for multi-modal and multi-feature scenarios today. By integrating both text and image data, a multi-modal search system can capture the user preference holistically, leading to more accurate and relevant search results.

In a multi-vector database, each row is an item, each column represents a feature of items, and each cell is a high-dimensional vector. A multi-vector search query is represented by several vectors, each of which corresponds to a feature. The multi-vector search query can be on all columns (i.e., features) or a subset of columns. A score function, defined between a query and an item, is an aggregation of feature-level scores, which are based on vector similarity, such as inner product or cosine distance. The query result is a set of top-k (where k is a positive integer) items with maximal scores.

In multi-vector databases, the choice of indexes can have a significant impact on performance. Index tuning for multi-vector search remains unclear and challenging. Existing solutions typically either use more storage space or require longer latency. One existing solution is "one-index-per-query", which creates one index for each query and takes more storage space and longer construction time when many queries are given. Another existing solution is "one-index-per-column," which has longer latency due to extracting a lot more candidates.

The present disclosure includes systems and methods that search a given workload of multi-vector queries identifying a best set of multi-vector indexes to minimize the workload latency while meeting storage and recall constraints. The systems and methods use multi-column indexes in answering the multi-vector queries. A multi-column index is an index on a sequence of vector-valued columns. Given a query, the systems and methods use a query execution strategy retrieving items from multi-column and/or single column indexes. A multi-column index is used to answer vector queries on any prefix of the indexed columns. The systems and methods find a query plan with a subset of indexes that includes an estimated recall and latency for a given query and a set of indexes. The systems and methods verify that the estimated recall and latency for the query plan are within the storage and recall constraints for the workload. The systems and methods output a recommended configuration of indexes in response to verifying the query plan is withing the storage and recall constraints. The present disclosure includes a number of practical applications that provide benefits and/or solve problems associated with multi-vector search index tuning. Examples of these applications and benefits are discussed in further detail below.

One example benefit is faster query evaluations. Multi-column indexes have better quality as compared to single-column indexes, resulting in faster query evaluations as compared to using the one-index per column approach. Another example benefit is smaller storage size. By avoiding creating one index for each query, the storage size is configurable for the systems and methods and a smaller storage size is used as compared to the one-index-per query existing solution.

In some implementations, the systems and methods choose the set of indexes using a query planner. The query planner uses algorithms in selecting the set of indexes for the multi-vector queries. In some implementations, the systems and methods use a configuration searcher that explores the space of possible indexes and selects a configuration that minimizes the workload's latency while meeting the recall and storage requirements. The configuration searcher explores the space of possible indexes choosing a configuration of vector indexes that minimizes the latency of the workload while meeting the recall and storage constraints.

In some implementations, the configuration searcher asks the query planner for the best query plan for a given set of indexes. For example, the indexes are hypothetical indexes based on sampling, which are less expensive than creating real indexes. The query planner uses a cost model and decides how best to use the hypothetical indexes generating an efficient query plan.

In some implementations, the systems and methods leverage generative AI models for the query planning and configuration searching. Examples of generative AI models include Generative Pre-trained Transformer (GPT) machine learning models (e.g., GPT-3 or GPT-4), LlaMA, and GEMINI. Examples of generative AI models also include text-to-image models, such as DALL-E. Generative AI models generate content, such as text, images, video, audio, or other data in response to a question or prompt. Another example of a generative AI model includes multi-modal models. In some implementations, the question or prompt is multi-modal input, and the generative AI model processes the multi-modal input to generate content. For example, the generative AI model receives non-text input and generates an output of text. Another example includes the generative AI model receives text input and generates a non-text output. Generative AI models learn the patterns and structure of the input training data and generate new data that has similar characteristics to the input data in response to prompts based on the instructions in the prompts.

One technical advantage of the systems and methods of the present disclosure is minimizing latency in multi-vector queries while meeting the storage and recall constraints. The systems and methods use multi-column indexes, resulting in faster multi-vector query evaluations. Another technical advantage of the systems and methods of the present disclosure is a smaller storage size of the multi-column indexes. The systems and methods choose which multi-column vector indexes to create for a given set of multi-vector queries and how to use the multi-column vector indexes in answering multi-vector queries. Another technical advantage of the systems and methods of the present disclosure is optimizing for latency and recall. The systems and methods include a cost estimator to optimize for latency and recall.

Referring now to FIG. 1, illustrated is an example environment 100 for multi-vector search index tuning. The environment 100 includes a data management system 102 with an index tuner 104 that identifies indexes to use with a multi-vector search query 10 that answers the multi-vector search query 10 with the lowest latency while meeting recall and storage constraints. A multi-vector search query 10 is a search query that uses multiple vectors to represent and search for information. A multi-vector search query 10 sends multiple queries across multiple vector fields in a search index.

The index tuner 104 receives an input 12 identifying a database 14, a multi-vector query workload 16, and constraints 18 and provides an output 20 with a recommended configuration 22 of indexes for the input 12. In some implementations, the database 14 includes the list of all vectors that may be subject to the multi-vector search query 10. In some implementations, the multi-vector query workload 16 is a set of multi-vector search queries that represent samples of multi-vector search queries that users of the data management system 102 provide. In some implementations, the constraints 18 include a storage budget and a recall threshold. The recall threshold is a minimum fraction of the vectors closest to the multi-vector search query 10 that should be returned by executing the query.

In some implementations, the index tuner 104 includes a configuration searcher 106 that searches for the recommended configuration 22 by interacting with a query planner

108 and a storage estimator 110. The configuration searcher 106 sends a configuration 24 and a multi-vector search query 10 from the multi-vector query workload 16 to the query planner 108. The configuration 24 is a set of indexes selected to use with the multi-vector search query 10.

The query planner 108 takes the multi-vector search query 10 and the configuration 24 as input and identifies a query plan 26 with a cost estimation 28 and a recall estimation 30. The query plan 26 provides an execution strategy for using a given set of indexes to execute a query. For example, the execution strategy explains how to use the subset of indexes to execute the multi-vector query 10. In some implementations, the query plan 26 is a best plan, that is, a plan that minimizes latency (e.g., cost) while meeting the recall requirement in the constraints 18.

In some implementations, the cost estimation 28 of the query plan 26 uses index scans and re-ranking cost, and the cost estimation 28 depends on how many items are retrieved from each vector index. Different parameters of the query plan 26 result in different query plans with different costs. One example equation that the query planner 108 uses in determining the cost estimation 28 is illustrated below in equation 1.

$$\text{cost}_{plan}(q, X, EK) = \left(\sum_{i=1}^{|X|} \text{cost}_{idx}(q, x_i, ek_i)\right) + \text{cost}_{rerank}(q, EK), \tag{1}$$

The cost is defined as a function of the query q, configuration X, and the index scan parameters EK, where $\text{cost}_{idx}$ (q, $x_i$, $ek_i$) is the cost of retrieving the top $ek_i$ items from the index scan of $x_i$ and $\text{cost}_{rerank}$ (q, EK) is the cost of re-ranking.

For each individual index scan, the query planner 108 defines the cost of retrieving the top-$ek_i$ items from $x_i$. Another example equation that the query planner 108 uses in determining the cost estimation 28 is illustrated below in equation 2.

$$\text{cost}_{idx}(q, x_i, ek_i) = x_i.\text{dim} \cdot numDist(q, x_i, ek_i) \tag{2}$$

Where $x_i$.dim is the dimension of $x_i$ and numDist(q, $x_i$, $ek_i$) is the number of distance computations (i.e., number of items compared). The dimensions differ across vector embeddings. For example, computing a distance on a 100-dimensional index is faster than on a 200-dimensional index. The number of invocations of the score function during the index scan is illustrated by numDist(q, $x_i$, $ek_i$).

The re-ranking cost is captured in $\text{cost}_{rerank}$ (q, EK). Another example equation that the query planner 108 uses in determining the cost estimation 28 is illustrated below in equation 3.

$$\text{cost}_{rerank}(q, EK) = q.\text{dim} \cdot \sum_{i=1}^{|EK|} ek_i \tag{3}$$

In some implementations, the query planner 108 uses equation 1, equation 2, and equation 3 in determining the cost estimation 28 of the query plan 26. In some implementations, the query planner 108 uses any combination of equation 1, equation 2, and equation 3 in determining the cost estimation 28 of the query plan 26.

One example equation that the query planner 108 uses in determining the recall estimation 30 of the query plan 26 is illustrated below in equation 3. The recall estimation 30 is determined by comparing the retrieved items with the ground truth. The ground truth is the truest closest vectors in the database to the multi-vector search query 10. One example equation that the query planner 108 uses in determining the recall estimation 30 is illustrated below in equation 4.

$$\text{recall}(q, X, EK) = \frac{\left|gt(q) \cap \left(\bigcup_{i=1}^{|X|} res(q, x_i, ek_i)\right)\right|}{|gt(q)|} \tag{4}$$

Where the ground truth item IDs is gt(q) and res (q, $x_i$, $ek_i$) is the $ek_i$ item IDs retrieved from index $x_i$. The recall is defined as the union of all retrieved item IDs.

One example includes a query $q^{1,3}$ gets the top-k (where k is a positive integer) items based on the first and third columns ($v_1$ and $v_3$). An example query plan 26 retrieves $k^1$ items from index $x^1$ using vector $v_1$ and retrieves $k^3$ items from index $x^3$ using vector $v_3$ for the query $q^{1,3}$. The query plan 26 re-ranks the ($k^1$+$k^3$) items using both $v_1$ and $v_3$. The query plan 26 returns the top-k items as the result where $k^1$ and $k^3$ are parameters of the query plan 26.

One example search algorithm that the query planner 108 uses in determining the query plan 26 is illustrated below in Algorithm 1. The query planner 108 uses Algorithm 1 in enumerating the combinations of subsets of indexes to identify a best query plan 26. In some implementations, the query planner 108 uses Algorithm 1 when a number of items in the multi-vector search query 10 is small or a number of indexes to search is small. For example, when the number of indexes is three or less, the query planner 108 uses Algorithm 1.

Algorithm 1: Search

```
Input: Query q; Top k; Candidate indexes X; Recall threshold
       θ_recall; Ground truth gt(q); Cost function
       cost_plan(q, X, EK).
Output: Query Plan (X, EK)
foreach 1 ≤ i ≤ |X| do
|  docPairs ← {(ID : j, Rank : ek_i_j)|1 ≤ j ≤ k} ∪ {(ID :
|     null, Rank : 0)}
|  ek_i_relevant ← sort docPairs by Rank
|_
(bestEK, bestCost) ← (null, ∞)
Search (1, Ø)                         // Defined below
return (X, bestEK)
Function Search (i, cover)
|  /* Assuming |X| ≥ 2                                  */
|  if i < |X| − 1 then
|  |  foreach 0 ≤ ek_i ≤ k do
|  |  |  cover ← cover ∪ {the ek_i-th doc ID in
|  |  |     ek_i_relevant}
|  |  |  Search (i + 1, cover)
|  |  |_
|  |_
|  else
|  |  /* i = |X| − 1                                      */
|  |  ek_|X| ← k
|  |  cvr_|X| ← {1 ≤ j ≤ k}
|  |  foreach 0 ≤ ek_i ≤ k do
|  |  |  cover ← cover ∪ {the ek_i-th doc ID in
|  |  |    ek_i_relevant}
|  |  |  Get the minimum ek_|X| and its corresponding cvr_|X|
|  |  |     satisfying |cover ∪ cvr_|X|| ≥ θ_recall · k
|  |  |  Update (bestEK, bestCost) if the cost of the current
|  |  |     {ek_i' |1 ≤ i' ≤ [X]} is lower
|  |  |_
```

-continued

Algorithm 1: Search

```
|   |_
|_
```

The input of the Algorithm 1 is the multi-vector query q, the top k items to retrieve, the candidate indexes X, a recall threshold $\theta_{recall}$, the ground truth gt(q), and the cost function $cost_{plan}$ (q, X, EK), where EK is the number of items retrieved. The output of the Algorithm 1 is the query plan 26.

Another example search algorithm that the query planner 108 uses in determining the query plan 26 is illustrated below in Algorithm 2. The query planner 108 uses Algorithm 2 in enumerating the combinations of subsets of indexes to identify a best query plan 26. In some implementations, the query planner 108 uses Algorithm 2 when a number of items in the multi-vector search query 10 is larger or a number of indexes to search is larger. For example, the query planner 108 uses the Algorithm 2 when the number of indexes exceeds three.

Algorithm 2: Dynamic Programming

```
Input: Query q; Candidate indexes X; Recall threshold θ_recall;
        Ground truth sample gt_sp(q); Cost function
        cost_cover(cvr, x_i).
Output: Query Plan (X, EK)
foreach 1 ≤ i ≤ |X| do
 |  docPairs ← {(ID : j, Rank : ek_i_j)|1 ≤ j ≤ k} ∪ {(ID :
 |     null, Rank : 0)}
 |  ek_i_relevant ← sort docPairs by Rank
 |_
/* DP(i, cover) for cost; EK(i, cover) for EK values. */
foreach cover ∈ 𝒫(gt_sp(q)) do
 |  DP(1, cover) ← cost_cover (cover, x_1)
 |  EK (1, cover) ← {ek_1 : max_{j∈cover} ek_1_j} // dictionary
 |_
foreach 2 ≤ i ≤ |X| do
 |  foreach cover ∈ 𝒫(gt_sp(q)) do
 |   |  DP(i, cover) ← ∞
 |   |  foreach cvr ⊆ cover do
 |   |   |  if DP(i, cover) >
 |   |   |     DP(i − 1, cover − cvr) + cost_cover(cvr, x_i) then
 |   |   |      |  DP(i, cover) ←
 |   |   |      |     DP(i − 1, cover − cvr) + cost_cover(cvr, x_i)
 |   |   |      |  EK(i, cover) ← EK(i − 1, cover − cvr) ∪ (ek_i :
 |   |   |      |     max_{j∈cvr} ek_i_j)
 |   |   |      |_
 |   |   |_
 |   |_
 |_
bestCover ← arg min_{|cover|≥θ_recall·k} DP(|X|, cover)
bestEK ← EK(|X|, bestCover)
return (X, bestEK)
```

The input of the Algorithm 2 is the multi-vector query q, the candidate indexes X, a recall threshold $\theta_{recall}$, the ground truth sample gt(q), and the cost function $cost_{cover}$ (cvr, $x_i$), where $x_i$ is the index. The output of the Algorithm 2 is the query plan 26.

In some implementations, the query planner 108 uses a cost estimator that is a machine learning model in generating the cost estimation 28 of scanning an index. For example, the cost estimator is a generative AI model. Examples of the generative AI model include a Generative Pre-trained Transformer (GPT) model (e.g., GPT-3 or GPT-4), LlaMA, and GEMINI). The cost estimator uses training data to estimate numDist(q, $x_i$, $ek_i$) in equation (2), which is the number of distance/score computations. The cost estimator is trained using training data trained for each single-column index in the database in estimating numDist(q, $x_i$, $ek_i$).

In some implementations, the query planner 108 uses a recall estimator that is a machine learning model in generating the recall estimation 30. For example, the recall estimator is a generative AI model. In some implementations, the recall estimator is trained with the same training data as the cost estimator.

The query planner 108 sends the query plan 26, the cost estimation 28, and the recall estimation 30 to the configuration searcher 106. The configuration searcher 106 explores different configurations and asks the query planner 108 for query plans, estimated costs, and estimated recall for configurations explored.

One example algorithm that the configuration searcher 106 uses in identifying the configuration 24 to send to the query planner 108 is illustrated below in Algorithm 3.

Algorithm 3: Beam Search

```
Input: Query workload W; Constraints θ_storage and θ_recall;
        Subset difference di; Seed limit se; Beam width b;
        Improvement threshold im; Query Planner.
Output: Configuration X*
Cand ← ∪_{q_i} {x | x.vid ⊆ q_{i.vid and |x.vid| ≥ |q_i.vid| − di}}
Seed ← ∪_{q_i} {X | X ⊆ 𝒫(q_{i.vid) and |X| ≤ se}}
Best ← b lowest-cost configurations in Seed that satisfy
  constraints θ_storage and θ_recall
repeat
 |  Conf ← Ø
 |  foreach X ∈ Best, x ∈ Cand do
 |   |  X' ← X ∪ {x}
 |   |  Get plans for all queries using X' from Query Planner and
 |   |     remove unused indexes from X'
 |   |  if X' satisfy constraints θ_storage and θ_recall then
 |   |   |  Conf ← Conf ∪ X'
 |   |   |_
 |   |_
 |  Best ← b lowest-cost configurations in Conf
until Cost improvement ≤ im
return configuration X* with lowest cost in Best
```

The input of Algorithm 3 includes the query workload W (the multi-vector query workload 16), constraints $\theta_{storage}$ and $\theta_{recall}$ (the constraints 18), subset different di, seed limit se, beam width b, improvement threshold im, and the output is the configuration X (the configuration 24). Within each iteration of the loop, the Algorithm 3 tries to add one more index to the existing configuration without violating constraints. The loop stops when the cost improvement is not more than parameter im.

In some implementations, the configuration searcher 106 is a machine learning model that identifies the configurations 24 using the Algorithm 3. For example, the configuration searcher 106 is a generative AI model.

The configuration searcher 106 interacts with the storage estimator 110 ensuring that the configuration 24 is within the constraints 18 provided with the input 12. The storage estimator 110 is independent of the multi-vector query 10. The storage estimator 110 receives the configuration 24 as input and outputs a storage estimation 32 for the configuration 24. In some implementations, the storage estimation 32 is the number of items multiplied by the degree and the size of each edge in the configuration 24. The configuration searcher 106 uses the storage estimator 110 in verifying that the query plan 26 is within the constraints 18 provided with the input 12. For example, the configuration searcher 106 verifies the cost estimation 28 is within the storage requirements, the recall estimation 30 is within the recall threshold, and the storage estimation 32 is within the storage requirements.

In some implementations, the index tuner 104 provides an output 20 with the query plan 26 as the recommended configuration 22 in response to verifying that the query plan 26 meets the constraints 18 provided in the input 12. In some implementations, the index tuner 104 adds additional query plans in response to determining that the storage estimation 32 is below the storage requirements and outputs the original query plan and the additional query plans as the recommended configuration 22 in response to verifying that the original query plan and additional query plans meet the constraints 18 provided in the input 12.

In some implementations, the data management system 102 sends an instruction to build a multi-vector search index with the recommended configuration 22 and the data management system 102 uses the multi-vector search index with the recommended configuration 22 in responding to multi-vector queries.

The environment 100 identifies a best set of multi-vector indexes to minimize a workload latency while meeting storage and recall constraints for a given workload of multi-vector queries.

In some implementations, one or more computing devices (e.g., servers and/or devices) are used to perform the processing of the environment 100. The one or more computing devices may include, but are not limited to, server devices, cloud virtual machines, personal computers, a mobile device, such as a mobile telephone, a smartphone, a PDA, a tablet, or a laptop, and/or a non-mobile device. The features and functionalities discussed herein in connection with the various systems may be implemented on one computing device or across multiple computing devices. For example, the data management system 102 and the index tuner 104 are implemented on a single computing device. Moreover, in some implementations, one or more subcomponents of the features and functionalities discussed herein may be processed on different server devices of the same or different cloud computing networks. For example, the data management system 102 and the index tuner 104 are implemented on different server devices.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

Figure 2:
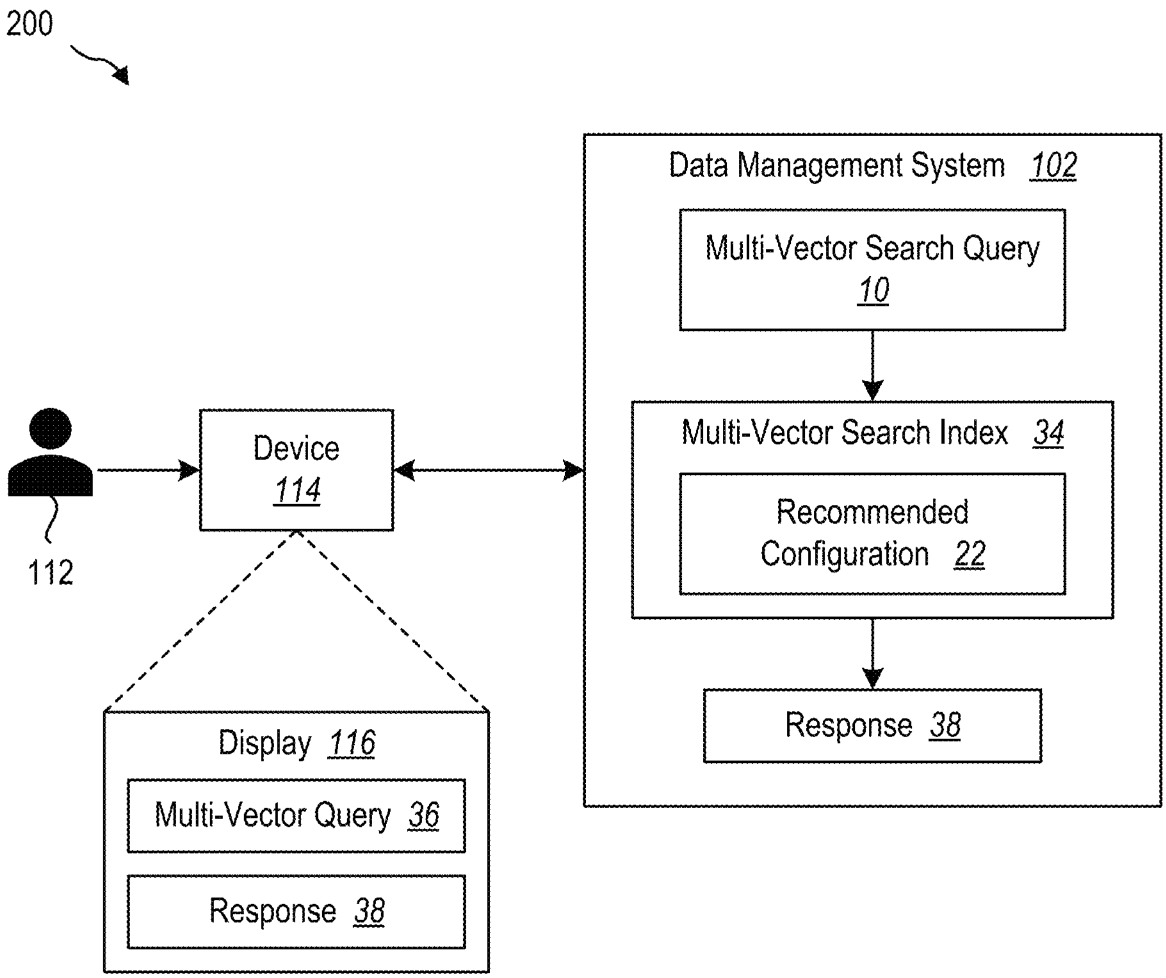
FIG. 2 illustrates an example environment for executing multi-vector queries in accordance with implementations of the present disclosure.

FIG. 2 illustrates an example environment 200 for executing a multi-vector query 10. The environment 200 includes the data management system 102 with a multi-vector search index 34 with the recommended configuration 22 provided by the index tuner 104 (FIG. 1). For example, the multi-vector search index 34 is generated in response to the data management system 102 instructing the formation of the multi-vector search index 34 with the recommended configuration 22. The data management system 102 uses the multi-vector search index 34 in responding to multi-vector queries 36 received.

In some implementations, the multi-vector search index 34 includes multi-column indexes. Multi-column indexes result in faster query evaluations for the multi-vector queries 36. In addition, multi-column indexes result in smaller storage. In some implementations, the multi-vector search index 34 includes a combination of multi-column indexes and single column indexes.

A user 112 accesses the data management system 102 using a device 114. The device 114 may be representative of one or multiple devices and may refer to various types of computing devices. For example, the device 114 may include a mobile device such as a mobile telephone, a smartphone, a personal digital assistant (PDA), a tablet, a laptop, or any other portable device. Additionally, or alternatively, the device 114 may include one or more non-mobile devices such as a desktop computer, server device, or other non-portable device. In some implementations, the device 114 may be communicatively coupled (e.g., wired or wirelessly) to a display 116 having a user interface thereon providing a display of system content.

The data management system 102 is in communication with the device 114 via a network. In some implementations, the data management system 102 is on a cloud server remote from the device 114 accessed through the network. For example, the data management system 102 is hosted on virtual machines in the cloud. The network may include one or multiple networks and may use one or more communication platforms and/or technologies suitable for transmitting data. The network may refer to any data link that enables transport of electronic data between devices of the environment 200. The network may refer to a hardwired network, a wireless network, or a combination of a hardwired network and a wireless network. In one or more implementations, the network includes the Internet. The network may facilitate communication between the various computing devices. The server may include one or more computing devices (e.g., including processing units, data storage, etc.) organized in an architecture with various network interfaces for connecting to and providing data management and distribution across one or more client systems. While one device is illustrated, the data management system 102 may be in communication with a plurality of devices.

In some implementations, the data management system 102 is accessed through a server address configured to an end point of the data management system 102 provided to the device 114 that the user 112 may access using a browser on the device 114. Another example includes an application on the device 114 of the user 112 that provides access to the data management system 102.

The user 112 provides a multi-vector query 36 to the data management system 102 using the device 114. The data management system 102 uses the multi-vector search index 34 in providing a response 38 to the multi-vector query 36. The response 38 is sent to the device 114 in response to the multi-vector query 36 and presented on the display 116. By using the recommended configuration 22, the multi-vector search index 34 focuses the search on a subset of data likely to have vectors with a small distance to the multi-vector query 36, improving query execution time while maintaining the recall and storage constraints.

Figure 3:
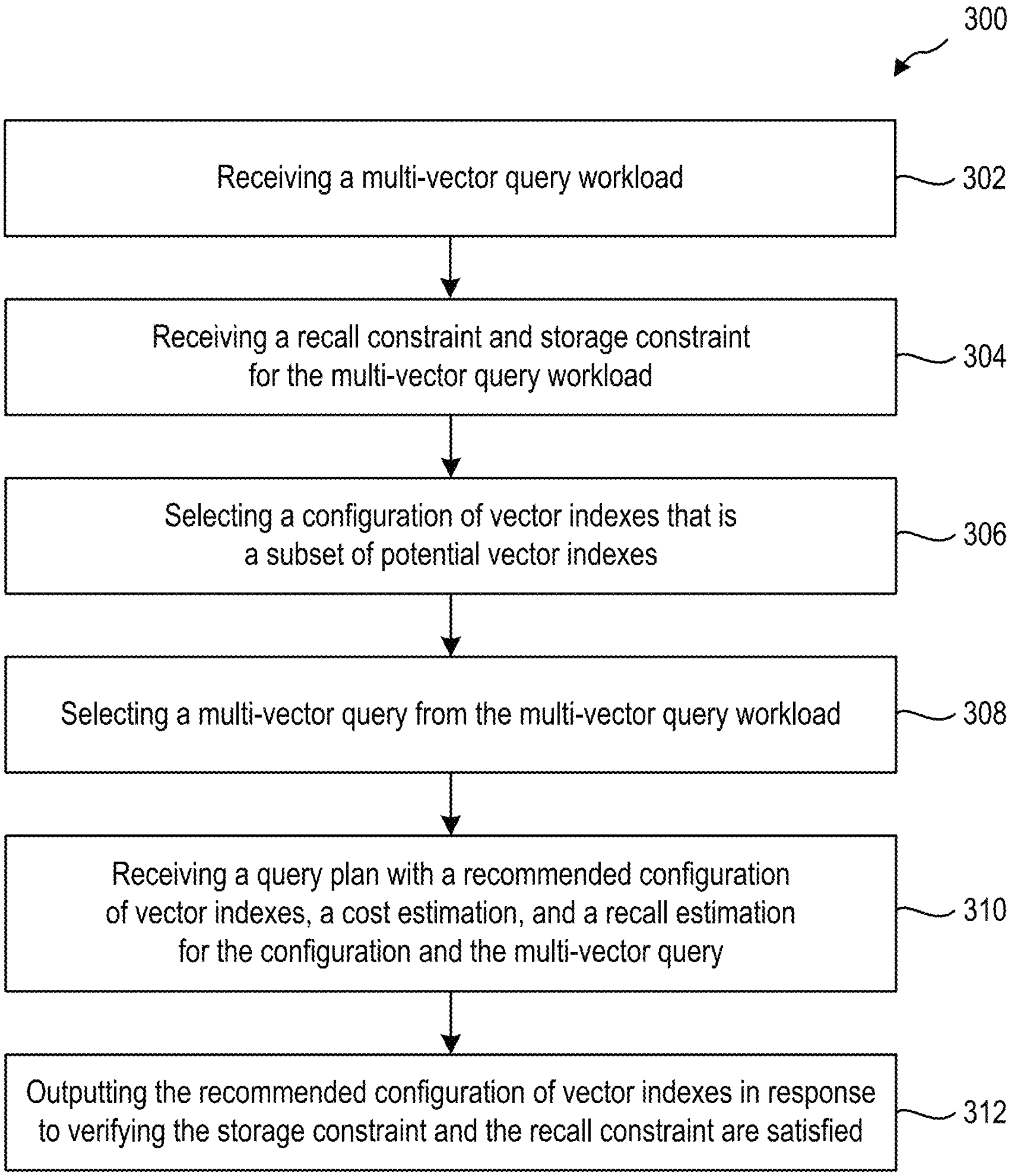
FIG. 3 illustrates an example method for multi-vector search index tuning in accordance with implementations of the present disclosure.

FIG. 3 illustrates an example method 300 for multi-vector search index tuning. The method 300 is discussed below in reference to FIGS. 1 and 2.

At 302, the method 300 includes receiving a multi-vector query workload. In some implementations, the index tuner 104 receives a multi-vector query workload 16. In some implementations, the multi-vector query workload 16 is a plurality of multi-vector search queries that represent samples of multi-vector search queries (e.g., the multi-vector search queries 36) that users (e.g., the user 112) of the data management system 102 provide.

At 304, the method 300 includes receiving a recall constraint and storage constraint for the multi-vector query workload. In some implementations, the index tuner 104 receives constraints 18 for the multi-vector query workload 16 including a recall constraint and a storage constraint.

At 306, the method 300 includes selecting a configuration of vector indexes that is a subset of potential vector indexes. In some implementations, the index tuner 104 selects a configuration 24 of vector indexes that is a subset of potential vector indexes. In some implementations, the index tuner 104 uses a machine learning model that searches, using an algorithm (e.g., Algorithm 3), possible indexes and identifies the subset of the potential vector indexes that minimizes a latency of the multi-vector query workload 16 while meeting the recall constraint and the storage constraint. The machine learning model selects the configuration 24 of vector indexes in response to the searching.

At 308, the method 300 includes selecting a multi-vector query from the multi-vector query workload. In some implementations, the index tuner 104 selects a multi-vector query 10 from the multi-vector query workload 16. In some implementations, the index tuner 104 selects different combinations of multi-vector queries 10 from the multi-vector query workload 16 and the configuration 22 of vector indexes to send to the query planner 108.

At 310, the method 300 includes receiving a query plan with a recommended configuration of vector indexes, a cost estimation, and a recall estimation for the configuration and the multi-vector query. In some implementations, the index tuner 104 receives a query plan 26 with a recommended configuration 22 of vector indexes, a cost estimation 28, and a recall estimation 30 for the configuration 24 and the multi-vector query 10. In some implementations, the query plan 26 provides an execution strategy with a subset of indexes from the configuration 22 of vector indexes to execute the multi-vector query 10. For example, the execution strategy explains how to use the subset of indexes to execute the multi-vector query 10.

In some implementations, the index tuner 104 uses a machine learning model that enumerates, using an algorithm (e.g., Algorithm 1 or Algorithm 2) different combinations of a subset of indexes from the configuration 22 of vector indexes. The machine learning model identifies the subset of indexes for the query plan 26 in response to using the algorithm.

In some implementations, the cost estimation 28 is determined based on an index scan cost and a re-ranking cost. In some implementations, the cost estimation 28 is based on a number of items retrieved from each index. In some implementations, the cost estimation 28 is based on a number of distance computations identifying a number of items compared. In some implementations, a machine learning model generates the cost estimation 28 by determining an index scan cost retrieving a number of items from an index and a re-ranking cost.

In some implementations, the recall estimation 30 is determined by comparing the retrieved items with a ground truth. In some implementations, the recall estimation 30 is generated by a machine learning model comparing the retrieved items with a ground truth.

At 312, the method 300 includes outputting the recommended configuration of vector indexes in response to verifying the storage constraint and the recall constraint are satisfied. In some implementations, the index tuner 104 outputs the recommended configuration 22 of vector indexes in response to verifying the storage constraint and the recall constraint are satisfied for the vector query workload 16. In some implementations, the recommended configuration 22 of vector indexes minimizes a latency of the multi-vector query workload 16. In some implementations, the recommended configuration 22 of vector indexes includes multi-column indexes. A multi-column index is an index on a sequence of vector-valued columns. In some implementations, the recommended configuration 22 of vector indexes includes a combination of multi-column indexes and single column indexes.

In some implementations, the method 300 includes using the recommended configuration 22 of vector indexes in responding to multi-vector queries 36. For example, the data management system 102 implements a multi-vector search index 34 with the recommended configuration 22 of vector indexes and uses the multi-vector search index 34 in responding to multi-vector queries 36 received from users (e.g., the user 112). In some implementations, the multi-column index is used to answer vector queries on any prefix of an index column in the multi-column index. In some implementations, the multi-column index is used to answer vector queries on columns that together form a prefix of the columns in the multi-column index.

The method 300 generates recommended configurations 22 of vector indexes that improve query execution time for multi-vector queries 36 while maintaining the recall and storage constraints.

Figure 4:
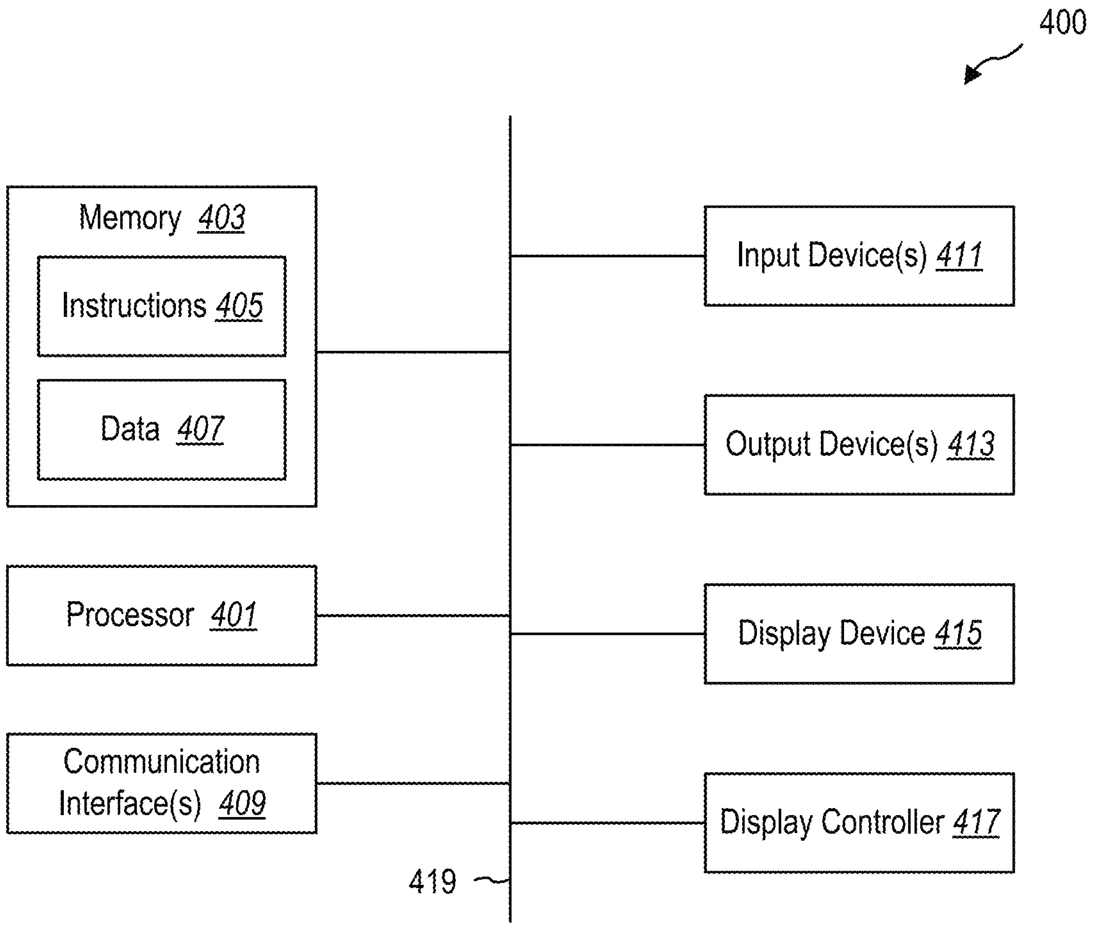
FIG. 4 illustrates components that may be included within a computer system in accordance with implementations of the present disclosure.

FIG. 4 illustrates components that may be included within a computer system 400. One or more computer systems 400 may be used to implement the various methods, devices, components, and/or systems described herein.

The computer system 400 includes a processor 401. The processor 401 may be a general-purpose single or multi-chip microprocessor (e.g., an Advanced RISC (Reduced Instruction Set Computer) Machine (ARM)), a special purpose microprocessor (e.g., a digital signal processor (DSP)), a graphics processing unit (GPU), a microcontroller, a programmable gate array, etc. The processor 401 may be referred to as a central processing unit (CPU). Although just a single processor 401 is shown in the computer system 400 of FIG. 4, in an alternative configuration, a combination of processors (e.g., an ARM and DSP) could be used.

The computer system 400 also includes memory 403 in electronic communication with the processor 401. The memory 403 may be any electronic component capable of storing electronic information. For example, the memory 403 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 405 and data 407 may be stored in the memory 403. The instructions 405 may be executable by the processor 401 to implement some or all of the functionality disclosed herein. Executing the instructions 405 may involve the use of the data 407 that is stored in the memory 403. Any of the various examples of modules and components described herein may be implemented, partially or wholly, as instructions 405 stored in memory 403 and executed by the processor 401. Any of the various examples of data described herein may be among the data 407 that is stored in memory 403 and used during execution of the instructions 405 by the processor 401.

A computer system 400 may also include one or more communication interfaces 409 for communicating with other electronic devices. The communication interface(s) 409 may be based on wired communication technology, wireless communication technology, or both. Some examples of communication interfaces 409 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 400 may also include one or more input devices 411 and one or more output devices 413. Some examples of input devices 411 include a keyboard, mouse, microphone, remote control device, button, joystick, trackball, touchpad, and lightpen. Some examples of output devices 413 include a speaker and a printer. One specific type of output device that is typically included in a computer system 400 is a display device 415. Display devices 415 used with embodiments disclosed herein may utilize any suitable image projection technology, such as liquid crystal display (LCD), light-emitting diode (LED), gas plasma, electroluminescence, or the like. A display controller 417 may also be provided, for converting data 407 stored in the memory 403 into text, graphics, and/or moving images (as appropriate) shown on the display device 415.

The various components of the computer system 400 may be coupled together by one or more buses, which may include a power bus, a control signal bus, a status signal bus, a data bus, etc. For the sake of clarity, the various buses are illustrated in FIG. 4 as a bus system 419.

In some implementations, the various components of the computer system 400 are implemented as one device. For example, the various components of the computer system 400 are implemented on a mobile phone or tablet. Another example includes the various components of the computer system 400 implemented on a personal computer. Another example includes the various components of the computer system 400 implemented on the cloud. Another example includes the various components of the computer system 400 implemented on an edge device.

As illustrated in the foregoing discussion, the present disclosure utilizes a variety of terms to describe features and advantages of the systems and methods. Additional detail is now provided regarding the meaning of such terms. For example, as used herein, a "machine learning model" refers to a computer algorithm or model (e.g., a classification model, a clustering model, a regression model, a language model, an object detection model, a probabilistic graphical model) that can be tuned (e.g., trained) based on training input to approximate unknown functions. For example, a machine learning model may refer to a neural network (e.g., a convolutional neural network (CNN), deep neural network (DNN), recurrent neural network (RNN)) or other machine learning algorithm or architecture that learns and approximates complex functions and generates outputs based on a plurality of inputs provided to the machine learning model.

As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining, and the like. Also, "determining" can include receiving (e.g., receiving information), accessing (e.g., accessing data in a memory), and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

The invention claimed is:

1. A method comprising:

receiving a multi-vector query workload;

receiving a recall constraint and storage constraint for the multi-vector query workload;

selecting a configuration of vector indexes that is a subset of potential vector indexes, wherein the configuration of vector indexes is selected based on searching possible vector indexes and identifying the subset of potential vector indexes that minimize latency of the multi-vector workload while meeting the recall constraint and the storage constraint;

selecting a multi-vector query from the multi-vector query workload;

receiving a query plan with a recommended configuration of vector indexes, a cost estimation, and a recall estimation for the configuration and the multi-vector query, wherein the query plan includes an execution strategy that explains use of the recommended configuration of vector indexes in executing the multi-vector query; and outputting the recommended configuration of vector indexes in response to verifying the storage constraint and the recall constraint are satisfied, wherein the recommended configuration of vector indexes includes a multi-column index, wherein the multi-column index is used to answer vector queries on any prefix of index columns.

2. The method of claim 1, wherein the query plan provides the execution strategy with a subset of indexes from the configuration of vector indexes to use in executing the multi-vector query.

3. The method of claim 2, wherein the query plan minimizes latency of the multi-vector query workload while meeting the recall constraint.

4. The method of claim 1, wherein the recommended configuration of vector indexes minimizes a latency of the multi-vector query workload.

5. The method of claim 1, wherein the multi-column index is an index on a sequence of vector-valued columns.

6. The method of claim 1, wherein the multi-column index is used to answer vector queries on columns that together form a prefix of the columns in the multi-column index.

7. The method of claim 1, wherein the recommended configuration of vector indexes includes a combination of multi-column indexes and single column indexes.

8. The method of claim 1, further comprising:

using the recommended configuration of vector indexes in responding to multi-vector queries.

9. The method of claim 1, wherein the cost estimation is determined based on an index scan cost and a re-ranking cost.

10. The method of claim 9, wherein the cost estimation is based on a number of items retrieved from each index.

11. The method of claim 7, wherein the cost estimation is based on a number of distance computations identifying a number of items compared.

12. The method of claim 1, wherein the recall estimation is determined by comparing retrieved items from each vector index with a ground truth.

13. The method of claim 1, wherein a machine learning model selects the configuration of vector indexes and generates the query plan.

14. A device comprising:

a memory to store data and instructions; and a processor operable to communicate with the memory, wherein the processor is operable to:

receive a multi-vector query workload;

receive a recall constraint and storage constraint for the multi-vector query workload;

select a configuration of vector indexes that is a subset of potential vector indexes, wherein the configuration of vector indexes is selected based on searching possible vector indexes and identifying the subset of potential vector indexes that minimize latency of the multi-vector workload while meeting the recall constraint and the storage constraint;

select a multi-vector query from the multi-vector query workload;

receive a query plan with a recommended configuration of vector indexes, a cost estimation, and a recall estimation for the configuration and the multi-vector query, wherein the query plan includes an execution strategy that explains use of the recommended configuration of vector indexes in executing the multi-vector query;

output the recommended configuration of vector indexes in response to verifying the storage constraint and the recall constraint are satisfied, wherein the recommended configuration of vector indexes includes a combination of multi-column indexes and single column indexes, wherein the multi-column index is used to answer vector queries on any prefix of index columns; and use the recommended configuration in responding to multi-vector queries.

15. The device of claim 14, wherein the processor is further operable to:

use a machine learning model that searches, using an algorithm, the possible indexes and identifies the subset of the potential vector indexes; and select, by the machine learning model, the configuration of vector indexes in response to the searching.

16. The device of claim 14, wherein the processor is further operable to:

use a machine learning model that enumerates, using an algorithm, different combinations of a subset of indexes from the configuration of vector indexes;

identify, by the machine learning model, the subset of indexes for the query plan in response to using the algorithm.

17. The device of claim 14, wherein the processor is further operable to:

generate the cost estimation by a machine learning model determining a cost of an index scan retrieving a number of items from an index and a re-ranking cost.

18. The device of claim 14, wherein the processor is further operable to:

generate the recall estimation by a machine learning model comparing retrieved items from each vector index with a ground truth.

19. The device of claim 14, wherein a multi-column index is an index on a sequence of vector-valued columns and multi-column index is used to answer vector queries on any columns that together form a prefix of the columns in the multi-column index.

20. The method of claim 1, wherein searching possible vector indexes includes searching hypothetical indexes based on sampling.

* * * * *